(12) United States Patent
Rubin

(10) Patent No.: US 8,955,325 B1
(45) Date of Patent: Feb. 17, 2015

(54) CHARGED ATOMIZATION OF FUEL FOR INCREASED COMBUSTION EFFICIENCY IN JET ENGINES

(75) Inventor: Stuart H. Rubin, San Diego, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 805 days.

(21) Appl. No.: 13/222,421

(22) Filed: Aug. 31, 2011

(51) Int. Cl.
| F23K 5/22 | (2006.01) |
| F23R 3/28 | (2006.01) |
| F23R 3/30 | (2006.01) |
| F02M 27/04 | (2006.01) |

(52) U.S. Cl.
CPC . *F23R 3/286* (2013.01); *F23K 5/22* (2013.01); *F02M 27/04* (2013.01); *Y02T 10/125* (2013.01)
USPC .............. 60/737; 60/202; 60/204; 60/738

(58) Field of Classification Search
CPC .............. B64G 1/403; F03H 1/0037–1/0075
USPC ................................................ 123/536–539
See application file for complete search history.

(56) References Cited

U.S. PATENT DOCUMENTS

| 3,016,233 | A | * | 1/1962 | Olmstead ........................ 261/81 |
| 3,067,948 | A | | 12/1962 | Lang et al. |
| 3,677,236 | A | * | 7/1972 | Moss ............................ 123/491 |
| 3,841,824 | A | * | 10/1974 | Bethel .............................. 431/8 |
| 3,851,823 | A | * | 12/1974 | Hori et al. ................... 239/102.2 |
| 3,861,852 | A | * | 1/1975 | Berger ............................. 431/1 |
| 3,893,434 | A | * | 7/1975 | Thatcher et al. ............. 123/478 |
| 3,907,940 | A | * | 9/1975 | Thatcher .......................... 261/1 |
| 4,023,544 | A | * | 5/1977 | Cole ............................. 123/537 |
| 4,105,004 | A | * | 8/1978 | Asai et al. ..................... 123/470 |
| 4,106,459 | A | * | 8/1978 | Asai et al. ..................... 123/439 |
| 4,176,637 | A | * | 12/1979 | Cole ............................. 123/537 |
| 4,237,836 | A | * | 12/1980 | Tanasawa et al. ............. 123/472 |
| 4,345,141 | A | * | 8/1982 | Little ............................. 219/207 |
| 4,439,980 | A | * | 4/1984 | Biblarz et al. .................. 60/778 |
| 4,515,138 | A | * | 5/1985 | Agadi ........................... 123/590 |
| 4,699,110 | A | * | 10/1987 | Iwano et al. .................. 123/472 |
| 4,726,686 | A | * | 2/1988 | Wolf et al. .................. 366/165.1 |
| 4,844,347 | A | | 7/1989 | Konhauser et al. |
| 4,865,006 | A | * | 9/1989 | Nogi et al. .................... 123/590 |
| 6,119,953 | A | | 9/2000 | Ganan-Calvo et al. |
| 2003/0029159 | A1 | * | 2/2003 | Provitola ...................... 60/203.1 |
| 2004/0020213 | A1 | * | 2/2004 | Jones .............................. 60/772 |
| 2006/0168936 | A1 | * | 8/2006 | Rooney ........................... 60/202 |
| 2007/0272220 | A1 | * | 11/2007 | Rozim ........................... 123/538 |
| 2008/0267783 | A1 | * | 10/2008 | Kraemer et al. ............ 416/90 R |
| 2009/0049839 | A1 | * | 2/2009 | Battles ............................. 60/734 |
| 2010/0024783 | A1 | * | 2/2010 | Tao et al. ...................... 123/538 |
| 2010/0252007 | A1 | * | 10/2010 | Gonzales et al. ............. 123/537 |

* cited by examiner

*Primary Examiner* — William H Rodriguez
*Assistant Examiner* — Rene Ford
(74) *Attorney, Agent, or Firm* — SSC Pacific Patent Office; Kyle Eppele; Arthur K. Samora

(57) ABSTRACT

Systems and methods are described for increasing the burn efficiency of fuel in a jet engine by charging the intake air molecules and inversely charging the fuel molecules, while reducing the fuel droplet size using a fuel-atomizing transducer in the air/fuel path. Generally speaking, an apparatus (and method) for increasing fuel burning efficiency in a jet engine is described, comprising: an intake air high voltage charger; a fuel injector downstream of the intake air charger; a fuel atomizer formed from an acutely angled transducer in a flow path of the fuel, wherein the atomized fuel is charged to an opposite voltage to that of the intake air; and an ignitor for igniting the atomized charged fuel and charged intake air for combustion.

18 Claims, 5 Drawing Sheets

CHARGED ATOMIZATION OF FUEL FOR INCREASED COMBUSTION EFFICIENCY IN JET ENGINES

FEDERALLY-SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone 619-553-2778; email: T2@spawar.navy.mil. Reference Navy Case No. 100621.

BACKGROUND

This disclosure relates generally to the field of fuel combustion in a jet engine. More particularly, this disclosure relates to modifying the air-fuel characteristics for more efficient combustion in jet engines.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a method for increasing fuel burning efficiency in a jet engine, comprising: charging intake air entering the jet engine using a high voltage first emitter in a path of the entering air; introducing fuel into the jet engine; atomizing the introduced fuel using an acutely-angled transducer in a flow path of the fuel; charging the atomized fuel to an opposite polarity of the first emitter; and igniting the atomized charged fuel and charged intake air for combustion.

In another aspect of the disclosed embodiments, a system for increasing fuel burning efficiency in a jet engine is provided, comprising: means for charging intake air entering the jet engine with a high voltage; means for introducing fuel into the jet engine; means for atomizing the introduced fuel, wherein the atomizing means is acutely angled in a flow path of the fuel; means for charging the atomized fuel with a high voltage, to an opposite polarity of the means for charging intake air; and means for igniting the atomized charged fuel and charged intake air for combustion.

In another aspect of the disclosed embodiments, an apparatus for increasing fuel burning efficiency in a jet engine is provided, comprising: an intake air high voltage charger; a fuel injector downstream of the intake air charger; a fuel atomizer formed from an acutely angled transducer in a flow path of fuel, wherein atomized fuel is charged to an opposite voltage to that of intake air charged by the intake air high voltage charger; and an ignitor for igniting the atomized charged fuel and charged intake air for combustion.

DETAILED DESCRIPTION

Figure 1:
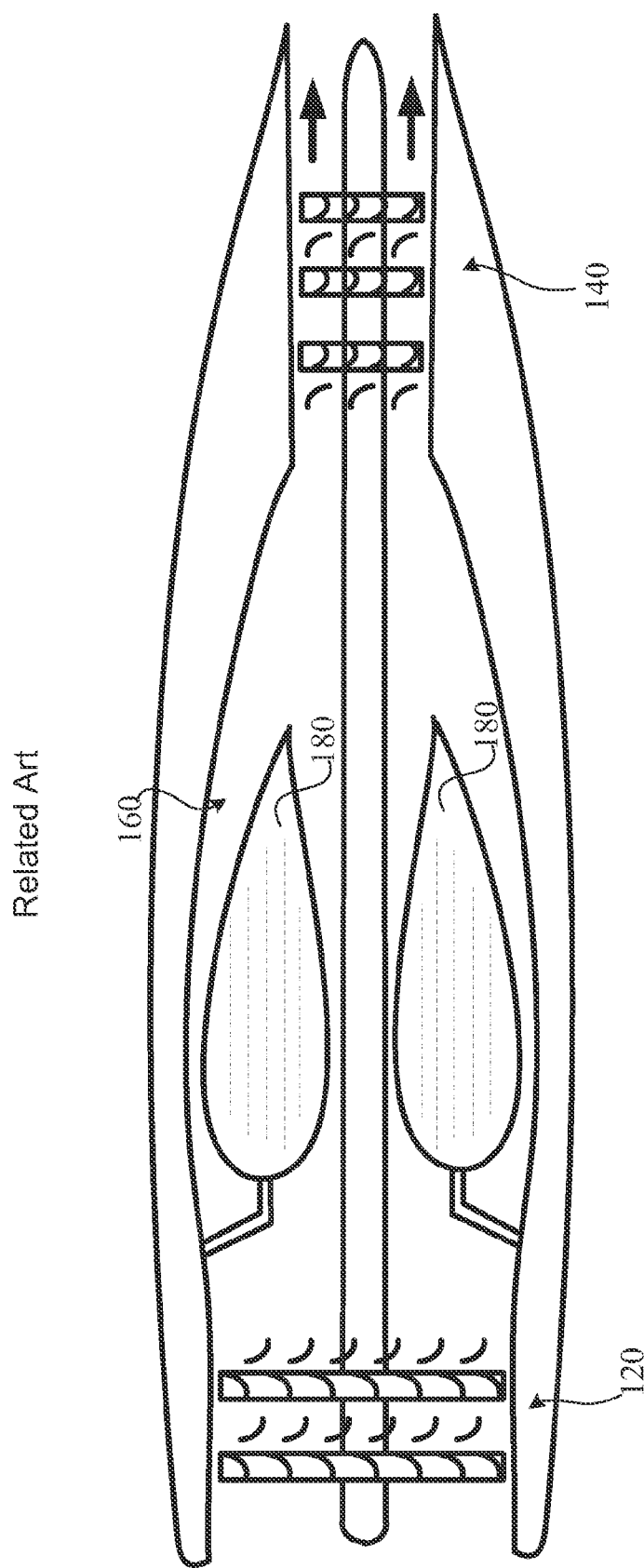
FIG. 1 is a cross-sectional illustration of a jet engine.

The operation of conventional jet engine systems is well understood. For example, FIG. 1 is a simple not-to-scale, cross-sectional outline of a related art turbojet engine in operation, showing inlet 120 and outlet turbines 140 bounding combustion chamber 160, which contains the air-fuel mixture that is ignited 180. However, the problem found in these jet systems is that jet fuel, which is essentially kerosene (Jet A, A-1, B) with additives to dissipate static electricity, such as Stadis 450, with dinonylnaphylsulfonic acid (DINNSA), antioxidants to prevent gumming, corrosion inhibitors, fuel system icing inhibitors, and biocides to remediate microbial growth, is not sufficiently atomized in the combustion chamber 160 to enable a complete burn. As a result, the exhaust contains an oily precipitate of carbon. It is well-known that homeowners in the flight path of jets will find black coatings consisting of this carbon on their property and other outdoor materials. Though this is a public nuisance, this also represents fuel that was not completely combusted. Therefore, this is not only a source of pollution, but also an indication of wasted potential energy.

As further described in the exemplary embodiments detailed below, a higher burn efficiency can be obtained by using sonification or a form of transducer-induced vibration to finely atomize the fuel, and inducing a charge in the fuel, via a charger or voltage emitter in the path of the fuel, so that the atomized fuel does not coalesce prior to combustion. In a non-limiting example, the atomization aspect can be achieved by using a relatively large surface area of transducers that the fuel can impinge upon or be affected by. To avoid an over reduction in velocity of the fuel, the transducers can be arranged in an "open" conical-like shape, with the transducers acutely angled toward the rear of the jet engine. Additionally, the ensuing fuel mist can be oxygenated by mixing it with the incoming compressed air, in most instances on the order of at least one hundred (100) psi, to better insure a complete burn.

Atomization of liquids into finer sizes are understood to be achievable by transducers, vibration plates, acoustic, and other now known or future devised methods and systems. Accordingly, while the exemplary embodiments described herein utilize transducers, other forms of atomization principles may be implemented without departing from the spirit and scope of this disclosure.

The reduced fuel droplet size can be maintained for at least a millisecond by a high-voltage electric field that is placed prior to the transducers or after the transducers. Reducing fuel droplet size is important in high-speed turbojet and supersonic ramjet engines because the faster the jet, the less time the fuel has to combust. In supersonic engines, the faster incoming air is compressed by the ambient shockwave. As a result, there is greater chance for cavitation damage (i.e., pitting) attributable to high amplitude supersonic vibrations of the engine core at supersonic speeds. For this reason, it is suggested herein that when applied to supersonic engines, the transducer cone be longer and more acute in angle.

A concern is immediately evident when attempting to atomize a liquid using vibration. It is understood that cavitation shock waves can ensue and can be sufficiently strong enough to significantly damage the turbines 160 and other parts. It is known that the threshold pressure required to initiate cavitation is a strong function of the pulse width and the power input. However, as evident below, there is no cavitation in the exemplary designs because the fuel drops are suspended in compressed air. In other words, there are no air or other bubbles in a liquid from which cavitation may ensue. One possible exception can occur if the fuel contains microbubbles of compressed air; however, these bubbles will oxidize the fuel and explode before they can find a surface on which they can do damage.

Figure 2:
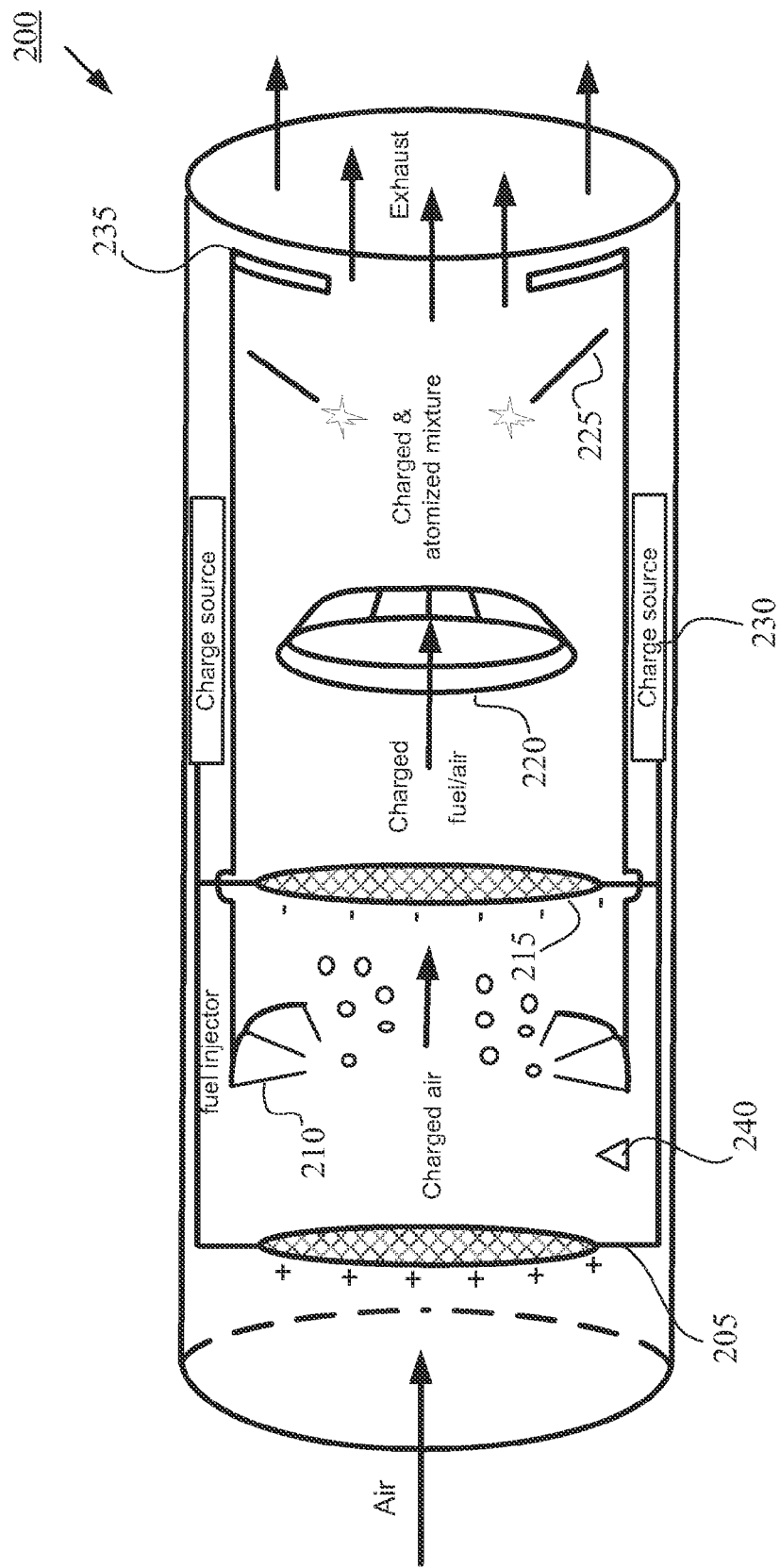
FIG. 2 is cut-away illustration of an exemplary fuel modification in a jet engine.
Figure 3A:
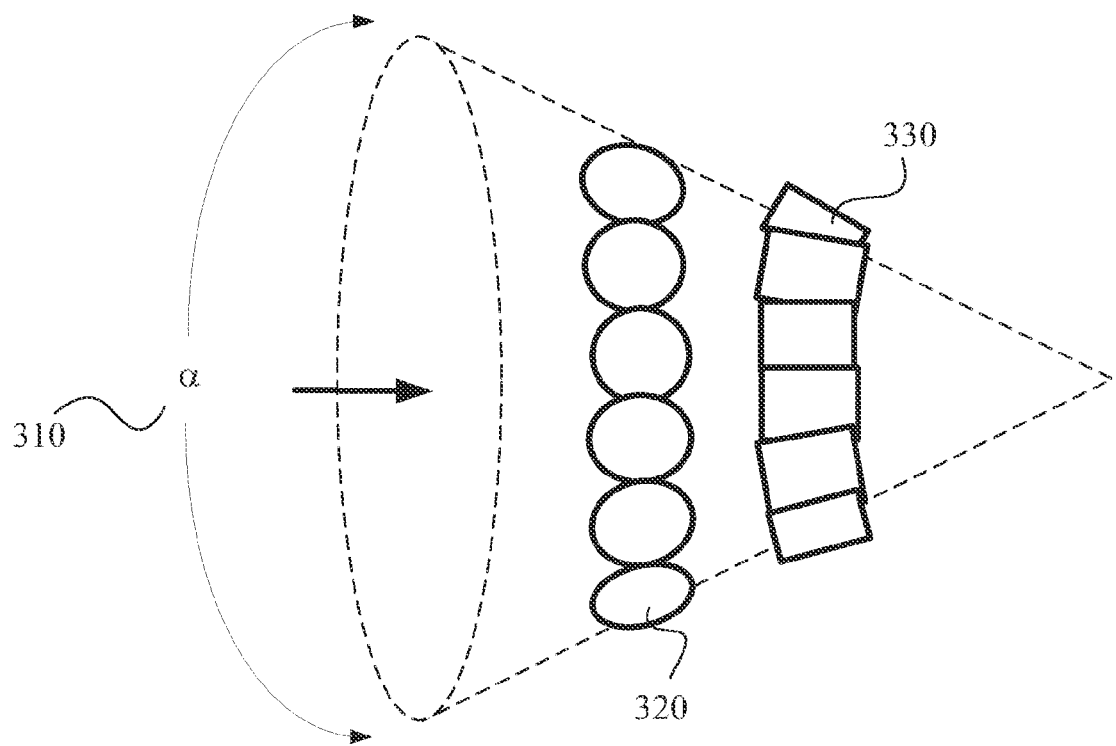
FIGS. 3A-B are illustrations of exemplary "rings" of transducers and a atomization of fuel simulation, respectively.
Figure 3B:
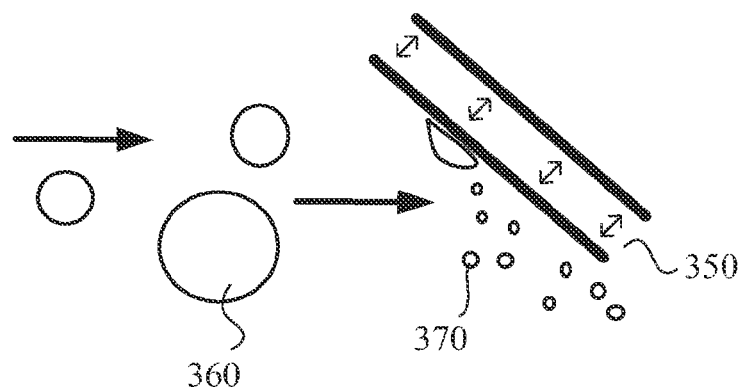
Figure 4A:
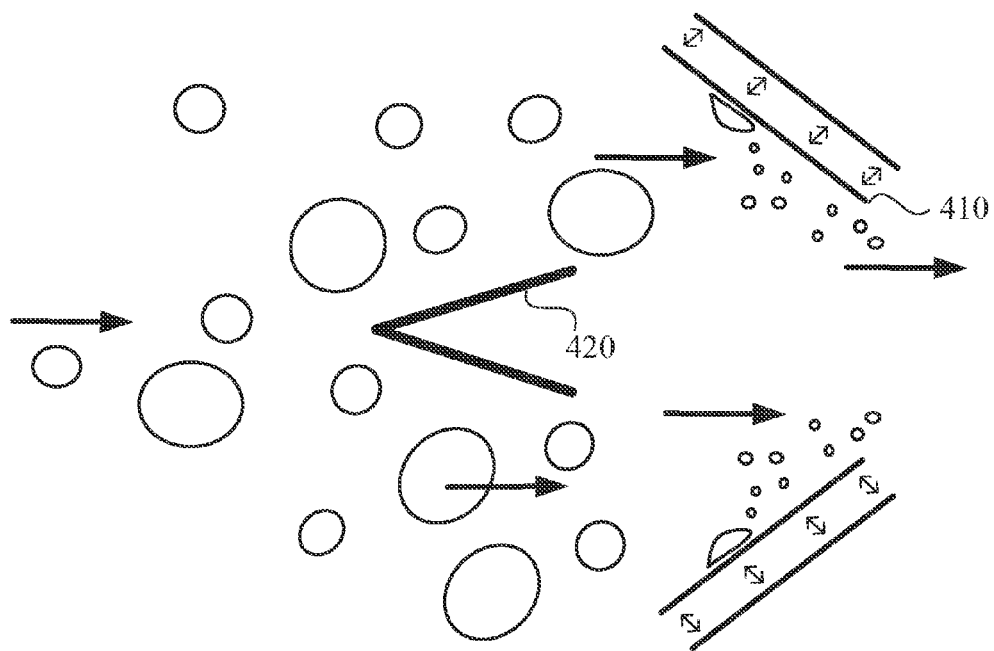
FIGS. 4A-B are illustrations of an exemplary atomization principles.
Figure 4B:
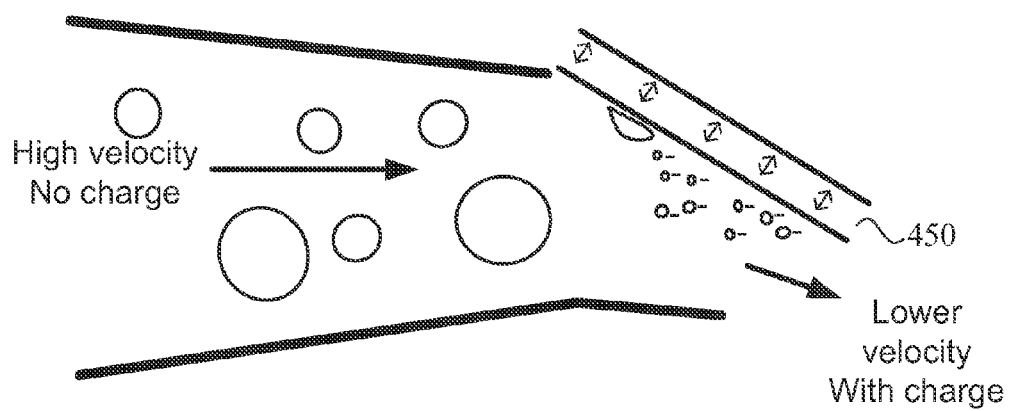
Figure 5:
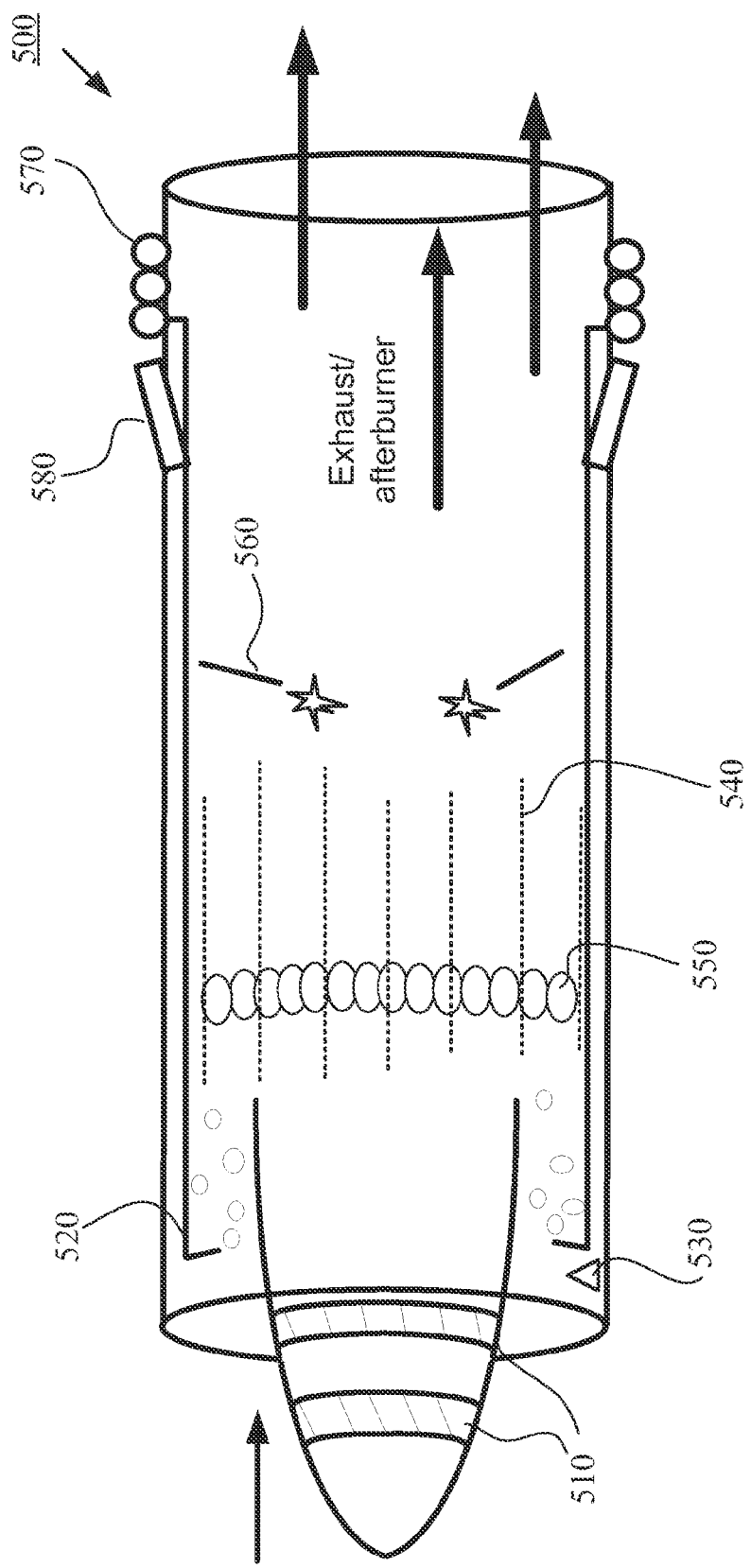
FIG. 5 is a cut-away illustration of another exemplary fuel modification in a jet engine.

FIG. 2 is a simple illustration of an exemplary fueling system for a jet engine 200. The exemplary fueling system contains an input air charged metallic mesh 205, fuel injector assembly 210, oppositely charged fuel charging metal mesh 215, conical-shaped array of transducers 220 for atomizing the fuel, igniters 225, and charge source 230. In operation, incoming air is compressed as it enters the engine 200 and contacts a charged metal mesh 205, shown in this example as being positively charged via charge source 230. The air, upon contact with the charged metal mesh 205, acquires a positive charge and flows toward the fuel injector assembly 210 which injects fuel into the charged air stream. The fuel can be charged with a polarity opposite that of the charged air stream to help bind the air with the fuel. The fuel can be charged via the charge source 230 (or another charging source) before or while it exits the fuel injector assembly 210 or via contact with the fuel charging metal mesh 215.

It is noted that the charging meshes 205, 215 should be conductive and strong enough to withstand the forces of the traveling air and fuel. Also, the meshing apertures should be large enough to avoid "blocking" the liquid (air or fuel), but small enough to be able to release (or attract) electrons to the passing liquid. In various non-limiting exemplary embodiments, the air mesh 205 can be fabricated from stainless steel or an equivalent, while the fuel mesh 215 can be fabricated from tungsten or an equivalent. In some embodiments, instead of using a mesh, tines or spines or protruding metal antennas acting as field emitters can be used, if deemed more efficient. Also, it is noted that the charge source may be independent of each mesh, that is, charging mesh 205 for the air may be charged to +100 KV and higher, for example, and charging mesh 215 for the fuel may be charged to −100 KV and lower. Of course, the actual charging voltages may be dependent on final design parameters and, therefore, may vary accordingly.

To avoid the microbubble scenario described above, the fuel can be introduced at its auto-ignition temperature or above it, to facilitate ignition before nucleation. To heat the fuel to the appropriate temperature prior to injection, optional fuel pre-heater 235 that is proximal to the exhaust side of the engine 200 may be utilized—by tapping residual exhaust heat. It is possible that microbubbling, over a course of time, will damage the fuel mesh 215 due to its close proximity, and allowing for its nucleation (and related stress corrosion). Super-hard or tough materials such as stainless steel, Stellite® (a registered trademark of the Deloro Stellite Company) or even polycrystalline diamond (PCD) are resistant to the deleterious effects of cavitation. Accordingly, simple testing can be utilized to determine the appropriate distance, material configuration, shape and other parameters that will mitigate any occurrence of cavitation effects.

Alternatively, controlled microbubbling (cavitation) can be used to enhance oxidation of the fuel because free radicals are generated in the process due to disassociation of fuel vapors trapped in the cavitation bubbles. It is noted that different types of materials may be used in the actual engine itself and cowling, etc., in view of recent advances in composite airframes and structures. In some instances, an insulating mylar film may be instituted in the engine or airframe structure to mitigate lightning strike damages that would affect the "engine" aspects of the exemplary embodiments described here.

Subsequent to fuel charging by the fuel mesh 215, the combined fuel/air mixture will encounter the transducer array 220 which operates to particularize or atomize the incoming fuel into a highly dispersed fuel/air suspension. The angled shape of the transducer array 220 is primarily conical in form to minimize drag forces on the fuel/air mixture as it passes or strikes the transducer array 220, while still providing a large enough surface to effectively atomize the fuel. Based on the flow rate, the transducers' energy can be reduced to produce non-inertial cavitation by extending the area of the cone (elongating the cone or narrowing the cone angle), thereby significantly eliminating damage by such process (as well as noise).

The transducers in the transducer array 220 should have a high enough vibrational capability to atomize the fuel and also the capability to resist the high temperatures found in engine 200. Possible transducer materials may be man-made piezoelectric ceramics such as lead zirconate titanate (PZT), the most common piezoelectric ceramic in use today, which is known to melt at 930° C. Other possible candidates are sodium tungstate which loses water at 100° C. and melts at 692° C.; potassium niobate which melts at 1050° C.; lithium niobate which melts at 1253° C.; and lithium tantalate which melts at 1650° C. The above list is a non-limiting sample of currently used transducer materials.

Accordingly, other materials currently known or future-developed may be utilized, as deemed appropriate. For example, a recently invented material called K-12 Ultra High-Temp Piezoelectric Ceramic, by Piezo Technologies, is marketed to be the most advanced material available for high-temperature applications. This bismuth titanate based material is specifically designed for stable piezoelectric activity in extremely high temperature applications; up to 593° C. (1100° F.) for continuous use or up to 760° C. (1400° F.) for intermittent use. It has an unmatched high Curie temperature (i.e., the temperature above which it loses its spontaneous polarization and piezoelectric characteristics) of greater than 820° C. (1508° F.). Other recently devised materials such as lanthanum-titanate and lanthanum titanate ($La_2Ti_2O_7$), having a high-Curie-temperature of 2600° F., have the potential for displacement at temperatures where commercial PZT have been known to fail.

In various exemplary embodiments, a frequency of oscillation of 2.4 MHz is utilized. In other exemplary embodiments, the frequency of oscillation can be varied according to design configuration and according to material capabilities. Therefore, while 2.4 MHz is described as one possible frequency for oscillation, other frequencies may be used without departing from the spirit and scope of this disclosure.

Concomitant with the step of imparting a charge to the fuel, a force-to-charge principle may be used in lieu of the fuel mesh 215. That is, it is possible that the transducer array 220 can impart the desired charge to the fuel. For example, it is known for water that, when mechanically subdivided into a mist, the mechanical energy takes the form of an electrostatic charge that is absorbed into the mist. Since like charged droplets repel each other they tend to remain subdivided, providing increased dispersion characteristics. Note that while some of the kinetic energy of motion imparted to the fuel will automatically be converted to an electrostatic charge, a supplemental electrostatic charge of the opposite polarity is imparted to the incoming compressed airstream to help insure a more complete combustion (i.e., by way of molecular electrostatic attraction).

However, in jet fuel, this effect is complicated by the fact that dinonylnaphthylsulfonic acid (DINNSA) is added to dissipate electrostatic charges by making the surface of the fuel slightly conductive to eliminate the static electricity caused by the triboelectric effect (related to mechanical movement). This means that jet fuel can be broken into a mist with less energy than required for a comparable amount of water, but lacking an electrostatic charge, the mist will have less endurance. To compensate for this effect, a negative DC high voltage charge via the fuel mesh 215 can be added to the jet fuel mist. The DINNSA additive then can become beneficial by holding the charge better and, thus preventing premature coalescence of the droplets, due to charge leakage.

Calculations have shown that the use of −100 KV (negative charge) on the fuel mesh 215 allows the fuel mesh 215 to have a mesh width separations of 1/7th inch at 128 psi (i.e., 1 inch at STP/$\log_2$ 128), which serves to minimize the chance of fouling while still delivering the charge to the droplets. In various embodiments, the fuel mesh 215 is to be made of tungsten or tungsten stainless steel alloy because some oxidation of the fuel mist will occur on the surface of the fuel mesh 215—raising its temperature by some amount, as well as to withstand the effects of possible nucleated cavitation (if higher transducer energies should be used). It is noted that tungsten melts at 3,422° C. (6,192° F.). It is also noted that this process is similar to that for catalytic conversion, by design.

Regarding the exemplary fueling systems described herein, if necessary, the fuel being pumped to the transducer array 220 should be preheated, to reduce its viscosity. The fuel will remain a liquid under pressure, but as it leaves the fuel injector assembly 210, it will be compressed and atomized by the transducer array 220 using, for example, a frequency of at least 2.4 MHz. The movement of such atomized fuel droplets through compressed air ensures their complete combustion before their coalescing. The rear turbine (not shown) pulls a vacuum on the ignitor (combustor) 225, which operationally keeps the atomized fuel from being deposited on the walls of the engine, where the possibility of damage by cavitation would be a concern.

When the jet fuel is heated, it should be heated to just above 210° C. for the following reasons: (1) heating it much more would result in the premature formation of gas pockets, which would result in incomplete combustion due to incomplete oxidation; and (2) heating it much less would imply increased viscosity, larger droplet size, and again incomplete combustion. To assure proper temperature regulation, a temperature sensor 240 such as, for example, a thermistor, may be placed near the fuel entry point or along the fuel injector assembly 210. Of course, the temperature threshold of 210° C. is based on the type of fuel used and, therefore, may vary accordingly.

Mechanisms for efficiently heating the fuel can be devised by one of ordinary skill in the art. One proposed approach is to have the fuel pre-heated by pre-heater 235 which can be simply a supply pipe inside an air pipe which is exposed to the exhaust. Some form of control to regulate the amount of heat transferred can be implemented, such as a solenoid controlling the amount of heated air exposed to the supply pipe. Of course, other mechanisms may be utilized as according to design preference. It is noted that with an exhaust-based fuel heating approach, some "before-combustion" fuel heating mechanism should be implemented, to account for startup where there is no exhaust to heat the fuel. Electrical heating can be considered a suitable candidate for startup heating. Alternatively, the use of a very fine Rhodium mesh can be used to preheat the fuel by way of its catalytic oxidation. The combination of electrical heating and catalytic heating is particularly attractive because the catalyst can thereby be readily and periodically de-poisoned, where each heating system otherwise serves to backup the other.

FIG. 3A is an illustration of a "conical" arrangement of transducers that may be utilized for atomizing fuel. The conical arrangement allows for incoming fuel to "graze" the interior surface of the transducers, allowing atomization while minimizing friction. Cone angle $\alpha$ may vary, depending on the size of the engine and performance parameters. Multiple transducer arrangements may be devised for the exemplary embodiments, for example, the circular disc arrangement 320 is suitable for ceramic discs that are overlaid to form a conical ring. Similarly, rectangular disc arrangement 330 may be suitable for non-ceramic transducer materials. While FIG. 3A illustrates the transducers having a particular geometric shape, it is understood that other shapes may be utilized, depending on the type of transducer used. Moreover, layering schemes other than the one shown may be implemented without departing from the spirit and scope of this disclosure.

FIG. 3B is a cut-away side view illustrating action of a transducer element 350 on large-sized fuel droplet 360. The vibrational motion of the transducer element 350 causes "impacting" fuel droplets to atomize into smaller droplets 370. It is noted that in some instances, the large-sized fuel droplets 360 may be atomized without actual contact with the transducer element 350. The physics behind atomization using vibration is well known and, therefore, is not further elaborated upon herein.

FIG. 4A is cut-away side view illustrating actions of transducer elements 410 formed in a conical shape with a central deflecting cone 420. This embodiment channels fuel, via the central deflecting cone 420, away from the central orifice formed from the conically-arranged transducer elements 410. It is understood that the center deflecting cone 420 may have a variable angle, or be displaced further (or closer) to the conically-arranged transducer elements 410. In view of the above, modifications of this embodiment may be devised without departing from the spirit and scope of this disclosure. For example, central deflecting cone 420 may act as a charging element, imparting charges to the deflected fuel. Additionally, while this and the above-described embodiments detail the fuel charging "mesh" to be forward of the transducer array, it is envisioned that it is possible to devise a system where the fuel charging "mesh" is after the transducer array, imparting a charge to atomized fuel, rather than to the pre-atomized fuel.

FIG. 4B is a cut-away illustration of a transducer plate 450 in a configuration analogous to a ramjet engine. In a ramjet engine, the air/fuel is funneled into a narrower channel, causing the air/fuel to become compressed. Prior to ignition, the air/fuel can be funneled past a transducer plate 450 and, as discussed above, the principle of mechanical energy-to-charge energy transference of a liquid impacting a surface can be used to generate the desired charge on the resulting atomized fuel. It is noted that while the transducer plate 450 is shown as being on the "top" of the engine, it may be interior to the engine, if so desired.

FIG. 5 is another exemplary embodiment for a supersonic jet engine 500. The incoming supersonic stream of air is charged via one or more charging rings or plates 510 to the desired voltage (in this instance, approximately +100 KV). Pre-heated fuel is then injected via fuel injectors 520 (with consideration to avoid exceeding the auto-ignition temperature). A temperature and/or pressure sensor 530 can be located proximal to the fuel injectors 520 to monitor and assist in the amount of pre-heating to the fuel. Charging rods 540 are oriented substantially parallel to the high speed incoming mixture, minimizing non-linear supersonic frictional resistance. The charging rods 540 can be made, for example, from tungsten or tungsten-stainless steel rods and impute a −100 KV voltage to the mixture to negatively charge it. The then charged, but partially atomized fuel comes into lateral contact with the transducer cone 550, having, a vibrational frequency, for example, of approximately 2.4 MHz. As noted above, other frequency and charging voltage values (as well as reversing the voltages) may be devised for the transducer cone 550, and charging rings 510 and rods 540, respectively.

It is noted that the charging rods 540 are configured to extend past the transducer cone 550, providing more charging surface area for the moving fuel/air mixture. Combustor or igniter 560 is shown downstream from the transducer cone 550, operating to ignite, if necessary, the air/fuel mixture. The ensuing exhaust may be supplied to an afterburner (not shown), where it would be mixed with more air and fuel. The exhaust can also be used for pre-heating the fuel via heating tubes 570 channeling heated fuel to the fuel injectors 520.

The amount of pre-heating of the fuel can be indirectly controlled by spoilers 580 that operate to deflect external air over the heating tubes 570. That is, the passage of external air at or above supersonic speed over the exposed heating tubes 570 will generate friction due to the buildup of shock waves that will increase the heating tubes' 570 temperature. Spoiler 580 can be used to control the amount of air that impacts the heating tubes 570 and ensuingly increase or decrease the amount of fuel pre-heating.

In view of above description, it is understood that while higher voltages in the air charging rings/meshes may be needed for the 100+ psi frontend compression, a higher amperage spread over a mesh grid having a larger surface area will serve to prevent the premature coalescing of the atomized drops—resulting in a more complete and faster burn. Also, in some embodiments, it may be desirable to allow some fuel and air to pass between a charging ring/mesh and cowling to draw heat away from the cowling while raising the temp of the fuel and air before they are mixed.

Accordingly, the exemplary embodiments will improve fuel efficiency and serve to reduce carbon or soot output for jet engines. Further, whereas hypersonic ramjets for Mark 5 or higher speeds are designed to burn hydrogen, since the fuel (jet fuel) will be in the combustion chamber for less than a millisecond, the exemplary embodiments allow for complete combustion of the fuel even when used with an anti-static additive. Therefore, the exemplary embodiments allow for a much faster burn and thus, the aircraft will be able to fly faster and with greater efficiency. These embodiments will enable faster combustion and thus allow retrofitted aircraft to cruise at higher velocity without the need to switch to far more costly and exotic fuels.

Accordingly, it will be understood that many additional changes in the details, materials, steps and arrangement of parts, which have been herein described and illustrated to explain the nature of the disclosure, may be made by those skilled in the art within the principal and scope of the disclosure as expressed in the appended claims.

What is claimed is:

1. A method for increasing fuel burning efficiency in a jet engine, comprising:
    charging intake air entering the jet engine using a high voltage first emitter in a path of the entering air;
    introducing fuel into the jet engine;
    atomizing the introduced fuel using a conical transducer in a flow path of the fuel;
    charging the atomized fuel to an opposite polarity of the first emitter, wherein the fuel is charged as a result of the fuel's interaction with the transducer; and,
    igniting the atomized charged fuel and charged intake air for combustion.

2. The method of claim 1, wherein the fuel is charged using a high-voltage second emitter in a path of the introduced fuel.

3. The method of claim 1, wherein the angled transducers form a conical segment, wherein the apex of the conical segment is oriented to an exhaust-side end of the jet engine.

4. The method of claim 1, further comprising pre-heating the introduced fuel to a pre-determined temperature.

5. The method of claim 4, wherein the fuel is pre-heated from exhaust heat from the jet engine.

6. The method of claim 5, wherein the pre-heating of the fuel is regulated by a temperature sensor in the jet engine.

7. The method of claim 6, wherein controllable spoilers attached to an exterior of the jet engine assist in regulating the pre-heating of the fuel.

8. The method of claim 1, wherein the intake air emitter is impressed with a voltage of a positive 100 KV or higher.

9. The method of claim 1, wherein the fuel emitter is impressed with a voltage of a negative 100 KV or lower.

10. The method of claim 1, wherein the transducer operates at a frequency of 2.4 MHz.

11. A system for increasing fuel burning efficiency in a jet engine, comprising:
    means for charging intake air entering the jet engine with a high voltage;
    means for introducing fuel into the jet engine;
    means for atomizing the introduced fuel, wherein the atomizing means is acutely angled in a flow path of the fuel;
    means for charging the atomized fuel with a high voltage, to an opposite polarity of the means for charging intake air; and
    means for igniting the atomized charged fuel and charged intake air for combustion.

12. An apparatus for increasing fuel burning efficiency in a jet engine, comprising:
    an intake air high voltage charger;
    a fuel injector downstream of the intake air charger;
    a fuel atomizer formed from a conical transducer in a flow path of fuel,
    wherein the transducer is an array of connected transducers formed from ceramic materials;
    wherein atomized fuel is charged to an opposite voltage to that of intake air charged by the intake air high voltage charger; and
    an ignitor for igniting the atomized charged fuel and charged intake air for combustion.

13. The apparatus of claim 12, wherein the fuel is charged using a high-voltage charger.

14. The apparatus of claim 12, wherein the intake air high voltage charger is a conductive mesh.

15. The apparatus of claim 13, wherein the fuel is charged using a conductive tungsten-based mesh.

16. The apparatus of claim 13, wherein the high-voltage charger for the fuel is an array of tungsten-based rods.

17. The apparatus of claim 12, wherein the angled transducers form a conical segment, wherein the apex of the conical segment is oriented to an exhaust-side end of the jet engine.

18. The apparatus of claim 12, further comprising a fuel pre-heater.

* * * * *